No. 715,604. Patented Dec. 9, 1902.
A. H. REID.
MILK COOLER.
(Application filed Dec. 19, 1901.)
(No Model.)
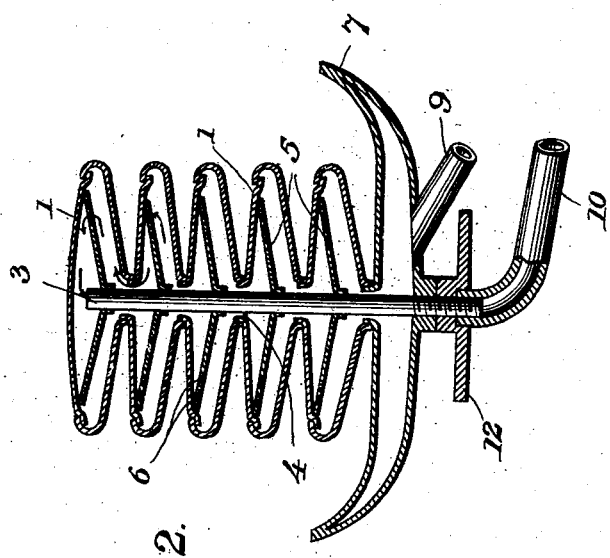
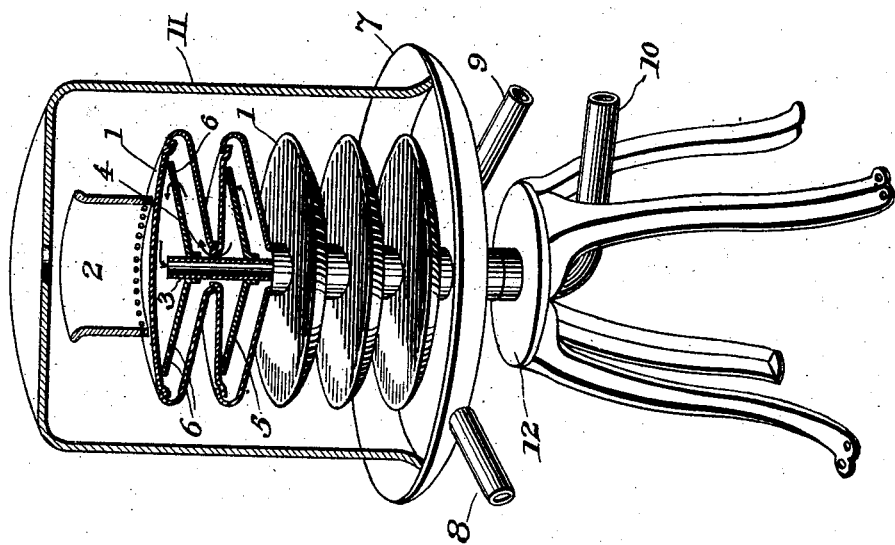
Witnesses
Inventor
A. H. Reid
Attorney

UNITED STATES PATENT OFFICE.

ALBAN H. REID, OF PHILADELPHIA, PENNSYLVANIA.

MILK-COOLER.

SPECIFICATION forming part of Letters Patent No. 715,604, dated December 9, 1902.

Application filed December 19, 1901. Serial No. 86,522. (No model.)

*To all whom it may concern:*

Be it known that I, ALBAN H. REID, of Philadelphia, county of Philadelphia, and State of Pennsylvania, have invented a new and useful Improvement in Milk-Coolers, of which the following is a specification.

This invention has reference to that type of liquid-coolers in which the liquid to be cooled passes over a surface within which a cooling medium is circulated; and the invention consists of improvements in the form, construction, and arrangement of the cooling-surface and in the means for circulating the cooling medium.

The invention consists also in the details of construction and combination of parts hereinafter described and claimed.

Referring to the drawings, Figure 1 is a perspective view of my improved apparatus, a portion being in section to expose the internal construction to view. Fig. 2 is a vertical longitudinal central section through the same.

In the accompanying drawings the apparatus is designed with special reference to the cooling of milk, and it comprises as its main elements a series of superposed communicating flat chambers 1, through which the cooling medium, usually water, is circulated and over which the milk to be cooled flows from a reservoir 2, supported on the topmost chamber. These chambers have their upper and under sides slightly inclined to cause the milk to flow along their surfaces, and near their centers, where they communicate with each other, they surround a vertical tube 3 to within a short distance of the same, so as to leave annular spaces 4, through which the water may pass from one chamber to the other. Within each chamber is arranged a circular partition or plate 5, fixed firmly at its center to the vertical tube and secured at its outer edge to the wall of the chamber near the periphery of the same, at which point the plate is formed with holes or perforations 6, the plates thus dividing each chamber into two compartments communicating with each other at the outer edges. The purpose of these partitions is to cause the water entering the chamber near its center to flow outward to its periphery before leaving the same, so that every portion of its surface will be subjected to the influence of the cooling medium. Beneath the lowermost chamber is arranged a pan 7 to receive the milk after it passes over the cooling-chambers, and from this pan the cooled milk is discharged through a pipe 8. The pan is hollow and communicates at its center with the lowermost cooling-chamber, and in the operation of the apparatus water is admitted under pressure through pipe 9 and passes into the lower chamber beneath the partition therein, then flows outward to the periphery of the chamber and through the holes in the partition, whence it returns toward the center of the chamber and flows upward and around the central tube and into the next chamber above, and so on throughout the entire series of chambers, passing alternately outward along the bottom of the chambers beneath the partitions and inward above the partitions until it arrives above the partition-plate in the top chamber, where it enters the upper end of the central tube 3 and flows downward centrally through the entire series of chambers and escapes through the outlet-pipe 10. During the circulation of the water in this manner the milk trickles over the outer surface of the chambers and collects in the pan 7, whence it is discharged through outlet-pipe 8.

It will be observed that in the construction described the water enters the bottom of the apparatus and after flowing upward successively through the several chambers and alternately outward and inward in each chamber it is discharged downward centrally through the bottom of the same. As a result the apparatus above the receiving-pan is free from projecting pipes or connections, so that the milk during its cooling process may be protected by a cover 11, seated in the pan.

The apparatus may be conveniently mounted on a platform or casting 12, sustained by legs, with the tube firmly fixed in the casting and the pan receiving support therefrom, as shown in Fig. 2. The partition-plates, by being secured, respectively, to the central tube and the walls of the chambers, serve to brace and strengthen the same and prevent their bending or collapse.

Having thus described my invention, what I claim is—

1. In a liquid-cooler, the combination with a series of superposed chambers adapted to have the liquid to be cooled passed over them and communicating with each other near the centers, of a hollow pan 7 communicating at its center with the lowermost chamber and extending at its periphery beyond the superposed chambers to receive the liquid trickling over them, a tube extending centrally through the superposed chambers and through the center of the hollow pan and communicating at its upper end with the top chamber of the series, partition-plates extending outward in each chamber from the tube, and a pipe 9 entering the interior of the hollow pan for the introduction of the cooling medium.

2. In a liquid-cooler, the combination with a support, of a vertical tube fixed therein, a sesies of superposed chambers sustained by the support and surrounding the tube and communicating with each other near their centers, and a series of disk-like partition-plates fixed at their centers to the tube, one above the other and extending outward, one in each chamber and each partition-plate having its outer edge firmly fixed to one of the walls of the chambers near the periphery of the same, and each plate formed with openings near its outer edge for the circulation of the cooling medium; whereby the partition-plates serve the twofold function of controlling the flow of the cooling medium and of bracing and maintaining the integrity of the structure as a whole.

In testimony whereof I hereunto set my hand, this 21st day of November, 1901, in the presence of two attesting witnesses.

ALBAN H. REID.

Witnesses:
R. S. REED,
MAY R. BREADBENT.